US005875814A

United States Patent [19]

Osborne

[11] Patent Number: 5,875,814

[45] Date of Patent: Mar. 2, 1999

[54] CERAMIC LINED PUMP ADAPTOR AND IN-LINE SPLITTER

[75] Inventor: Lee R. Osborne, Cedar Bluff, Va.

[73] Assignee: Ceramic Technology Inc., Cedar Bluff, Va.

[21] Appl. No.: 848,056

[22] Filed: Apr. 29, 1997

[51] Int. Cl.[6] .................................................... F16K 31/00

[52] U.S. Cl. ............................ 137/375; 137/565; 137/875

[58] Field of Search ..................................... 137/565, 375, 137/872, 875; 417/900; 251/122, 368

[56] References Cited

U.S. PATENT DOCUMENTS

| | | | |
|---|---|---|---|
| 1,215,819 | 2/1917 | Kuehn | 137/875 |
| 4,338,963 | 7/1982 | Frame | 137/375 |
| 4,732,364 | 3/1988 | Seger et al. | 251/122 |
| 4,865,353 | 9/1989 | Osborne | 285/16 |

*Primary Examiner*—A. Michael Chambers
*Attorney, Agent, or Firm*—Sughrue, Mion, Zinn, Macpeak & Seas, PLLC

[57] ABSTRACT

A pump adaptor outlet pipe is provided with a smaller diameter section to be secured to the outlet of a pump and a larger diameter section connected to the smaller diameter section by means of an annular shoulder. The small diameter section and the larger diameter section, as well as the shoulder, are completely lined with ceramic tile material. An in-line flow diverter pipe section is provided with a pivoted value plate. The value plate and the pipe section are completely lined with ceramic material for diverting the flow of material passing through the pipe section proportionally between two smaller diameter outlet pipes.

5 Claims, 2 Drawing Sheets

CERAMIC LINED PUMP ADAPTOR AND IN-LINE SPLITTER

BACKGROUND OF THE INVENTION

The present invention is directed a ceramic lined pump adaptor for connecting a pump outlet having a first diameter with standard piping of a larger diameter. The present invention is also directed to a ceramic lined in-line splitter having a pivoted gate mounted in a pipe with opposite surfaces of the gate being covered with ceramic material.

The concept of lining a pipe, in particular a pipe elbow with ceramic material to provide greater wear resistance to abrasive material flowing therethrough, is old and well known in the art as evidenced by the U.S. Patents to Davis (U.S. Pat. No. 4,684,155) and Osbourne (U.S. Pat. No. 4,865,353).

The use of flow diverters in a pipe fitting to selectively divert the flow from a main passage to either of two branches is old and well known in the art. The U.S. Patents to McIver (U.S. Pat. No. 3,773,062) and Marrelli (U.S. Pat. No. 5,165,450) each disclose a flow diverter valve pivotally mounted between two branch lines for diverting the flow from a main line to either of the branch lines upon pivotal movement of the valve. Neither of these patents, however, provide a ceramic lining for the pipe surfaces or ceramic material on the diverter valves.

SUMMARY OF THE INVENTION

The present invention is directed to a new and improved pump adapter for coupling the outlet of a pump with standard piping in a manner which will substantially increase the life of the adaptor. The pump adaptor is comprised of a pipe fitting having a smaller diameter portion adapted to be connected to the pump and a larger diameter portion adapted to be connected to the standard piping of a larger diameter. The smaller diameter section and the larger diameter section are connected to each other by a shoulder with both portions of the pipe and the shoulder being completely covered by means of a ceramic lining. A clean out door is provided in the larger diameter portion to enable a plugged pipeline to be emptied.

The present invention is also directed to a ceramic splitter adapted to be used in standard piping for diverting the flow of material from the larger diameter standard pipe to either of two smaller diameter branch pipes. The entire pipe fitting is lined with ceramic material which also completely covers the surfaces of the diverter member.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
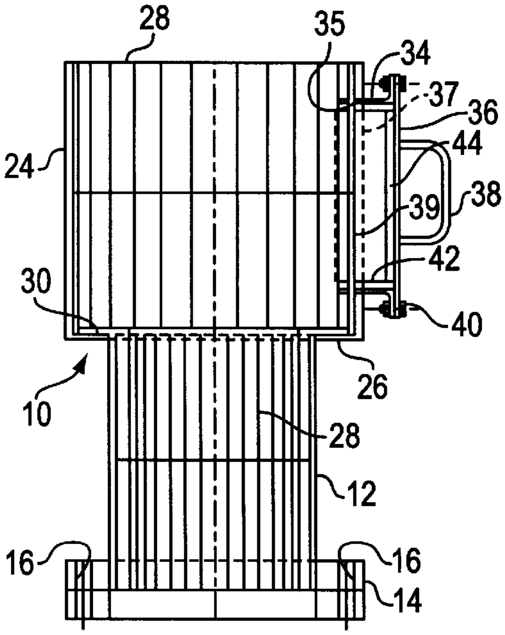
FIG. 1 is a sectional view of the pump adaptor 10 according to the present invention.
Figure 3:
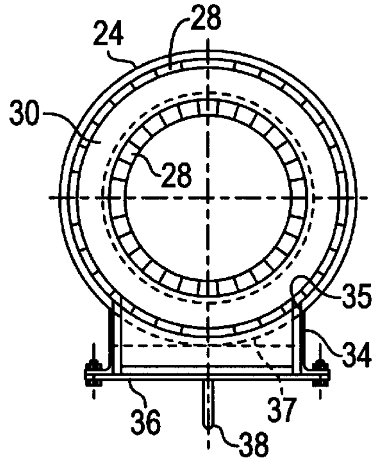
FIG. 3 is an end view of the larger diameter pipe section in FIG. 1.
Figure 2:
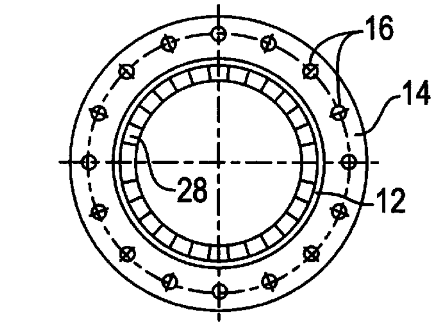
FIG. 2 is an end view of the smaller diameter pipe section in FIG. 1.
Figure 4:
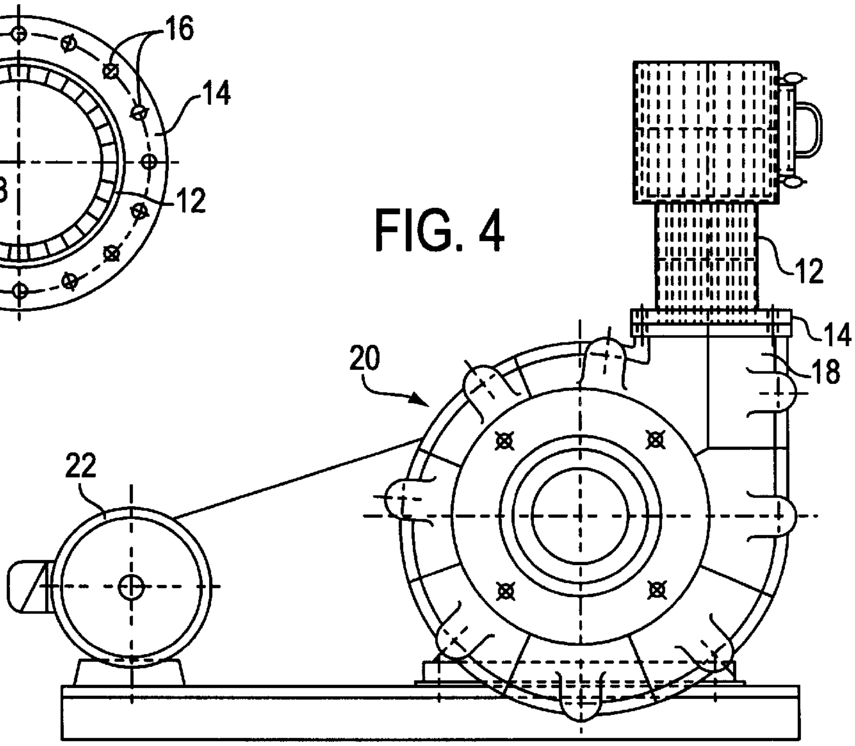
FIG. 4 is a side elevational view of the pump adapter installed on the outlet of a motor driven pump.

The pump adaptor 10 is comprised of a first smaller diameter portion 12 having a larger diameter flange 14 at one end thereof with a plurality of bolt holes 16 for connecting the adaptor to the outlet 18 of a pump 20 driven by a suitable motor 22. The smaller diameter pipe section 12 is connected to a larger diameter pipe section 24 by means of an annular shoulder 26. The annular shoulder 26 is connected to both the smaller diameter section 12 and the larger diameter section 24 by welding or other connecting means depending upon the material of the piping. In any event, a unitary one piece pump adaptor is provided. The interior surfaces of both sections 12 and 24 are lined with ceramic tiles by any suitable means. The individual ceramic tiles are comprised of elongated narrow strips which are aligned in the axial direction of the pipeline to facilitate the insulation of the ceramic lining in a cylindrical pipe.

The materials for manufacturing the ceramic tiles are not particularly limited and may be any of the conventional materials employed in the art. Preferred are ceramic materials and more preferred are ceramic alumina oxide ceramic materials. An example of a suitable material is manufactured by Ferro, 1230 Railroad Street, East Liverpool, Ohio 43920. An annular tile lining 30 is provided for the shoulder portion 26 and may be comprised of a single annular piece or a plurality of smaller pieces interfitted to form the annular piece. The shoulder tile 30 is disposed at right angles to the tiles 28 in the larger diameter portion and the smaller diameter portion. The ceramic tiles 28 in the smaller diameter portion may be substantially thicker than the tiles 28 in the larger diameter portion since the flow of abrasive materials through the smaller diameter portion tends to provide a more abrasive affect on the lining.

A cylindrical flange 34 is secured to the larger diameter section 24 and completely surrounds an opening 35 through the section 24. A cover or door 36 having a handle 38 thereon is secured to the flange 34 by means of nuts and bolts 40. A cylindrical support sleeve 42 is connected to a plate 44 secured to the door 36. The sleeve 42 is slidable within the flange 34 and is connected to a curved circular plate 37 which had previously been cut from the pipe section 24 to provide the opening 35. The plate 37 fits closely within the opening 35 and is lined with ceramic tiles 39 which are flush with the other ceramic tiles 28 to provide a smooth interior surface for the pipe section 24. Thus, a clean out port is provided which will not cause any turbulence within the pipe section 24. In the event the pipe becomes clogged, it is possible to remove the nuts and bolts 40 and remove the door and the plate 37 for the purpose of cleaning out the pipe section 24.

Figure 5:
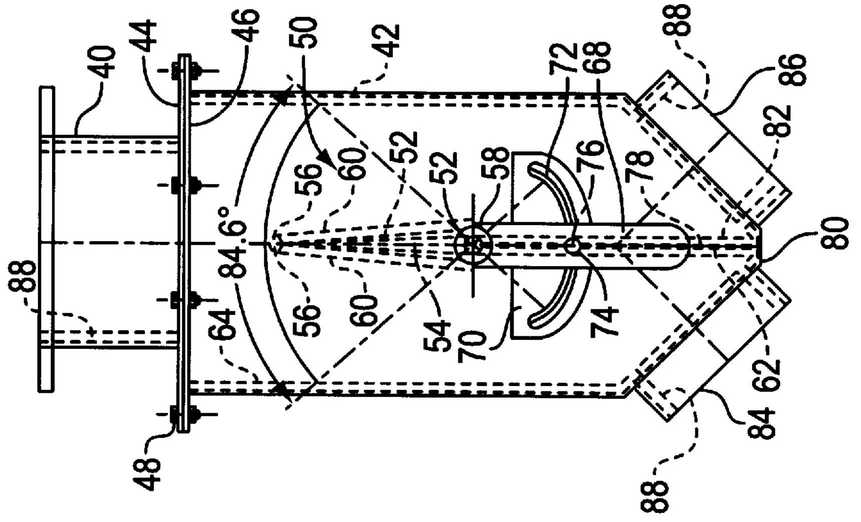
FIG. 5 is a side elevational view of an in-line ceramic lined flow splitter having two outlets disposed at right angles to each other.

The flow splitter shown in FIG. 5 is comprised of a first pipe section 40 having a smaller diameter and a second pipe section 42 having a larger diameter pipe section. Both pipe sections are provided with complementary flanges 44 and 46 having bolt holes for the reception of nut and bolt assemblies 48 to secure the two pipe sections together. A diverter valve plate 50 is pivotally connected within the pipe section 42 by means of a pivot support 52. The diverter valve 50 is comprised of first and second plates 52 and 54 which are engaged at their outer end 56 and which are connected to a tubular sleeve 58 which fits about the pivot member 52. The outer surfaces of the two plates 52 and 54 are completely lined with strips of ceramic material 60 similar to the strips 28 shown in FIG. 1. The configuration of the outer circumference of the diverter valve 50 is such as to enable a close fitting seal with the ceramic lining 64 of the larger diameter pipe section 42. The upper end of the valve plate is provided with a beveled end piece 66 which facilitates the close sealing engagement between the valve plate and the pipe section lining. Externally of the pipe section 42, an elongated arm 68 is secured to the pivot member 52.

A plate 70, having an arcuate slot 72 therethrough, is mounted on the side of the pipe section 42 underneath the arm 68. A bolt 74 is provided with a head (not shown) which is disposed on the opposite side of the plate 70 from the arm 68 and which is of such a size as to prevent the movement of the bolt through the slot 72. The bolt 74 extends through an aperture in the arm 68 and a nut 76 is threaded on the bolt. Upon loosening the nut 76, the arm 68 may be pivoted to the left or right as viewed in FIG. 5, thereby pivoting the diverter valve plate 50 into engagement with either side of the pipe section 42. A separator plate 78 is secured to the bottom 80 of the pipe section 42 and extends upwardly to the pivot member 52. Opposite sides of the plate 78 are lined with ceramic tiles 82. A pair of outlet pipes 84 and 86 are secured to the lower ends of the pipe section 42 at right angles to each other. Both outlet sections 84 and 86 are lined with ceramic tiles 88.

In operation, the flow of abrasive material enters through the smaller diameter pipe section 40 which is also lined with ceramic material 88. If the diverter valve plate 50 is pivoted counterclockwise, as viewed in FIG. 5, into engagement with the pipe section 42, the entire flow will pass outwardly through the outlet pipe 86. Likewise, if the diverter valve plate 50 is pivoted in the clockwise direction into engagement with the pipe section 42, the entire flow will be diverted outwardly through the outlet 84. The diverter valve plate 50 may be secured at any desirable angle to proportionately divide the flow between the outlet pipes 84 and 86.

Figure 6:
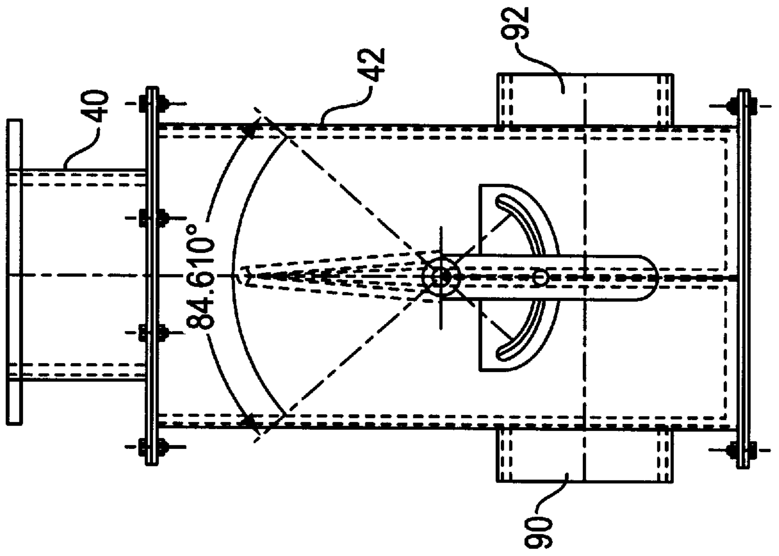
FIG. 6 is a side elevational view of a modified in-line ceramic flow splitter having two oppositely directed outlets.

The diverter valve arrangement shown in FIG. 6 is substantially identical to that shown in FIG. 5 with the exception of the two outlet pipes 90 and 92, which are disclosed at right angles to the axis of the pipe section 42 in alignment with each other. The operation of the flow diverter valve shown in FIG. 6 is identical with that shown in FIG. 5.

While the invention has been particularly shown and described with reference to preferred embodiments thereof, it will be understood by those in the art that the foregoing and other changes in form and details may be made therein without departing from the spirit and scope of the invention.

What is claimed is:

1. A pump adaptor pipe section adapted to be connected to the outlet of a pump for pumping abrasive materials comprising a first smaller diameter pipe section, flange means on one end of said smaller diameter pipe section for connecting the smaller diameter pipe section to the outlet of the pump, a larger diameter pump section secured to an opposite end of the smaller diameter pipe section by means of a transverse shoulder, ceramic tiles lining the smaller diameter pipe section, the larger diameter pipe section and the shoulder to prevent abrasive wear on the pump adaptor, said ceramic tile lining in the smaller diameter section being thicker than the ceramic tile lining on the larger diameter section.

2. A pump adaptor pipe as set forth in claim 1, further comprising clean out port means extending through said larger diameter pipe section for removing clogged materials from the interior of the pump adaptor pipe, said clean out port means having a removable portion of said larger diameter pipe section detachably secured to said larger diameter pipe section, said removable portion being lined with ceramic tiles which are flush with the ceramic tiles of said larger diameter pipe section to prevent turbulence within said larger diameter pipe section.

3. An in-line flow diverter pipe section comprising a larger diameter pipe section, two smaller diameter outlet pipe sections secured at one end of said larger diameter pipe section in communication therewith for receiving flow of material from the larger diameter pipe section, a separator wall diametrically secured within said larger diameter pipe section and connected to said end of said larger diameter pipe section located between two outlet pipe sections and valve means pivotally mounted in said larger diameter pipe section for proportionally directing a flow of material entering the large diameter pipe section to said outlet pipes, ceramic tiles completely lining said larger diameter pipe section and said smaller diameter outlet pipe sections, , said separator wall and said diverter valve means being completely covered with ceramic tile material.

4. An in-line flow diverter pipe section as set forth in claim 3, further comprising a smaller diameter inlet pipe section secured to an opposite end of said larger diameter pipe section.

5. An in-line flow diverter pipe section as set forth in claim 3, further comprising operating means located externally of said larger diameter pipe section for pivoting said valve plate and locking means for securing said flow diverter valve plate in any desired angular pivoted position within said larger diameter pipe section.

* * * * *